United States Patent
Kearney et al.

(10) Patent No.: US 6,217,643 B1
(45) Date of Patent: Apr. 17, 2001

(54) COLOR FORMER COMPOSITION AND MICROCAPSULES CONTAINING THE COMPOSITION

(75) Inventors: Francis R. Kearney, Holland; Sean L. Daly, Muskegon; Darrel E. Cardy, Whitehall, all of MI (US)

(73) Assignees: ESCO Company, Muskegon, MI (US); Yamamoto Chemicals, Inc. (JP)

( * ) Notice: Subject to any disclaimer, the term of this patent is extended or adjusted under 35 U.S.C. 154(b) by 0 days.

(21) Appl. No.: 09/498,638

(22) Filed: Feb. 7, 2000

Related U.S. Application Data

(60) Provisional application No. 60/120,193, filed on Feb. 16, 1999.

(51) Int. Cl.[7] .................................................. C09D 11/00
(52) U.S. Cl. ..................... 106/31.22; 503/221; 503/215; 503/213; 428/402.2
(58) Field of Search ..................... 106/31.22; 503/221, 503/213, 215; 428/402.2, 402.21, 402.22

(56) References Cited

U.S. PATENT DOCUMENTS

| | | | |
|---|---|---|---|
| 5,272,127 | * 12/1993 | Mandoh et al. | 503/207 |
| 5,635,319 | * 6/1997 | Hotta et al. | 430/19 |
| 6,071,853 | * 6/2000 | Kirk et al. | 503/221 |

FOREIGN PATENT DOCUMENTS

| | | |
|---|---|---|
| 11-254840 | 9/1999 | (JP) . |
| 11-291626 | 10/1999 | (JP) . |
| WO12318 | 3/2000 | (WO) . |
| WO26037 | 5/2000 | (WO) . |

* cited by examiner

*Primary Examiner*—Helene Klemanski
*Assistant Examiner*—Veronica F. Faison
(74) *Attorney, Agent, or Firm*—Burns, Doane, Swecker & Mathis, L.L.P.

(57) ABSTRACT

A color former composition which is composed of a mixture of the color formers 3-diethylamino-6-methyl-7-(2',4'-dimethylanilino)fluoran and 3-dibutylamino-6-methyl-7-anilinofluoran in defined amounts. Further compositions contain mixtures of color formers including one or both of these fluoran compounds and the color formers 3-dibutylamino-6-methyl-7-anilinofluoran and/or 3-diethylamino-6-methyl-7-(3'-methylanilino)fluoran. Microcapsules containing the color former compositions can be prepared from a composition which also contains an organic solvent and can be used to prepare a pressure sensitive or thermal recording material. The mixture of color formers can provide a higher concentration in various organic solvents and/or can be used with less expensive solvents.

49 Claims, No Drawings

COLOR FORMER COMPOSITION AND MICROCAPSULES CONTAINING THE COMPOSITION

CROSS-REFERENCE TO RELATED APPLICATIONS

This application claims priority under 35 U.S.C. §§119 and/or 365 to Provisional Application No. 60/120,193 filed in the United States on Feb. 16, 1999; the entire content of which is hereby incorporated by reference.

BACKGROUND OF THE INVENTION

A. Field of the Invention

The present invention relates to a color former composition which comprises a mixture of defined color formers. The present invention further relates to micro-capsules containing the color former composition.

B. Description of the Related Art

Color formers are an essential ingredient for various types of recording material. Recording materials that contain both microcapsules containing colorless color former dissolved in a solvent and developer are widely used. In the recording material, the color former reacts with the developer to form a colored image.

The recording material can be a pressure sensitive material or a heat sensitive material. With pressure sensitive material, the microcapsules containing the color former are ruptured by application of pressure to form a color image through the reaction of the color former with the developer. The pressure sensitive recording material includes carbonless copy paper recording material wherein a color former layer comprising microcapsules containing a color former and a developer layer containing the developer are respectively formed on surfaces of separate supports or separate surfaces of one support and are in contact with each other to be used; and self-coloring pressure sensitive recording material (e.g., pressing-type paper or self-contained paper) comprising a self-coloring layer having both the color former and the developer provided on one side surface of a support.

The carbonless copy paper recording material generally includes an upper paper having a color former layer provided on one side surface of a support (which usually is a sheet of paper) that is generally referred to as a CB sheet, an intermediate paper having a color former layer provided on one side surface of a support and a developer layer on another side surface of the support that is generally referred to as a CFB sheet, and a lower paper having a developer layer provided on one side surface of a support that is generally referred to as a CF sheet. The intermediate paper is usually used in the form of two or more sheets. Such carbonless copy paper recording material is employed by bringing the color former into contact with the developer by rupturing the microcapsules by pressure to form a color image.

In the self-coloring pressure sensitive recording material, when pressure is applied to a surface having a self-coloring layer, microcapsules in the layer are ruptured to form a color image on the self-coloring layer through the reaction of the color former with the developer. Therefore, the material is usually employed for writing or drawing an image such as a letter on a paper placed on the self-coloring layer with writing instruments or a typewriter, for directly printing a colored image on the self-coloring layer with a printer or a typewriter, or for printing a letter for OCR (optical character reader) on the self-coloring layer.

In preparation of plural copies, a self-coloring pressure sensitive recording material using an upper paper having a self-coloring layer provided on one side surface of a support and a color former layer on another side surface of the support, in combination with an intermediate paper having a color former layer and developer layer and a lower paper having a developer layer is occasionally employed. The types of the self-coloring layer of the self-coloring pressure sensitive recording material include a layer composed of two layers consisting of a color former layer containing microcapsules containing a color former and a developer layer containing a developer which are superposed upon each other, and a single layer consisting of one layer containing a color former and a developer.

The heat sensitive recording materials containing microcapsules, for example, are those having a heat sensitive layer which contains microcapsules containing a color former and a developer, as described in the literature such as in Japanese Patent Provisional Publication No. 63(1988)-265682 and No. 1(1989)-105782. Such recording material has the advantages that it can be designed for OHP (over head projector) or multicolor type.

The microcapsules, which are contained in the above recording materials, contain a color former dissolved in a solvent. It is necessary that such solvent is capable of dissolving the color former. Examples of the solvents generally include kerosene, paraffin, naphthene oil, alkylated biphenyl, alkylated terphenyl, chlorinated paraffin, alkylated naphthalene, diaryl alkane and phthalic acid ester. Some of these solvents generally give off noxious odors and some may be harmful so that environmental pollution can occur.

Over the years, the art has developed a number of color formers which are readily dissolved in various solvents with the resulting solutions formulated into microcapsules for recording material. For instance, published European Patent Application No. 629511 discloses a recording material containing both microcapsules containing an electron-donating color former dissolved in a solvent and an electron-accepting developer. The solvent comprises a glyceride and the electron-donating color former comprises a fluoran compound of the formula:

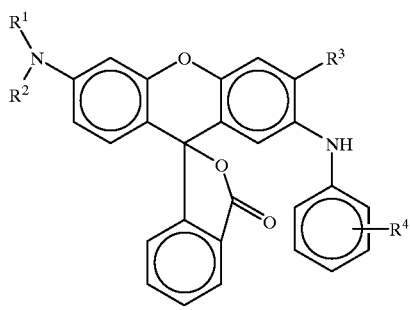

wherein $R^1$ represents an alkyl group of 1 to 4 carbon atoms, $R^2$ represents a branched alkyl group of 4 to 12 carbon atoms or a tetrahydrofurfuryl group, and each of $R^3$ and $R^4$ independently represents a hydrogen atom, a halogen atom or a methyl group, provided that $R^1$ differs from $R^2$.

Published PCT Application No. WO 95/07187 describes an internal phase solution for a coating of rupturable microcapsules for application to a base sheet to form a pressure-sensitive record material. The solution comprises one or more color formers of which at least 90% are monoamino and/or diamino fluoran derivatives dissolved in a solvent comprising 80% to 100% of one or more vegetable and/or animal oils. The color formers preferably comprise only monoamino and/or diamino fluoran derivatives and the solvent comprises only one or more vegetable and/or animal oils. Dissolution of the color formers in the solvent may take place at a temperature in the range 100° C. to 135° C. and microcapsules containing such a color former solution may be formed by conventional coacervation processes below 70° C. Disclosed illustrative color formers are 2'-(octylamino)-6'-(diethylamino) fluoran, 2'-anilino-3'-methyl-6'-(diethylamino) fluoran, 6'-(diethylamino)-2'-(1,1-dimethylethyl) fluoran, and 6'-(dibutylamino)-3'-methyl-2'-(phenylamino)-spiro [isobenzofuran-1(3H),9'-[9H]xanthen]-3-one.

U.S. Pat. No. 4,837,210 describes certain chromogenic dialkyl-substituted aniline fluoran compounds which can be used as color formers in recording materials. The compounds are disclosed as being initially substantially colorless, but produce gray-black colored products on reaction with certain acidic developer materials. In the background of the patent, other U.S. patents are noted including U.S. Pat. No. 4,226,912 which relates to a heat-sensitive recording material containing a chromogenic material which is composed of at least 60% by weight of two or more kinds of black color developing fluoran compounds. Published European Patent Application No. 672,730 discloses mixtures of color formers including fluoran color formers in pellet form which are useful in pressure sensitive and heat sensitive recording material. It has also been reported that a 1:1 mixture of 3-diethylamino-6-methyl-7-(2',4'-dimethylanilino)fluoran and 3-dibutylamino-6-methyl-7-anilinofluoran has been used to attain better solubility in a composition that is encapsulated and used in a recording material.

Despite various advances, the art has continued to seek color formers that can be dissolved at higher concentrations and/or can be dissolved in safer and/or less expensive solvents.

BRIEF SUMMARY OF THE INVENTION

In one aspect, the present invention provides a color former composition comprising a mixture of from about 65 to about 90% by weight of 3-diethylamino-6-methyl-7-(2',4'-dimethylanilino)fluoran and from about 10 to about 35% by weight of 3-dibutylamino-6-methyl-7-anilinofluoran based on the total weight of said fluoran compounds.

In another aspect, the present invention provides a color former composition comprising a mixture of 3-dibutylamino-6-methyl-7-anilinofluoran and 3-diethylamino-6-methyl-7-(3'-methylanilino)fluoran.

In a further aspect, the present invention provides a color former composition comprising a mixture of 3-diethylamino-6-methyl-7-(2',4'-dimethylanilino)fluoran and 3-diethylamino-6methyl-7-(3'-methylanilino)fluoran.

In a still further aspect, the present invention provides microcapsules containing a color former composition and being capable of forming a recording material wherein the color former composition comprises an organic solvent and a color former composition which comprises a mixture of defined color formers.

DETAILED DESCRIPTION OF THE INVENTION

As noted above, one aspect of the present invention relates to a color former composition comprising a mixture of 3-diethylamino-6-methyl-7-(2',4'-dimethylanilino) fluoran and 3dibutylamino-6-methyl-7-anilinofluoran. These color formers are individually known in the art and are commercially available. For instance, 3-diethylamino-6-methyl-7-(2',4'-dimethylanilino)fluoran has the following chemical structure:

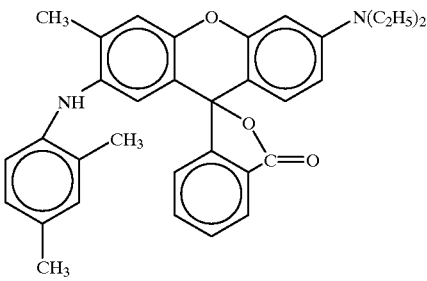

This compound is available from ESCO Company under the designation Black XV and can be prepared in accordance with the process described in aforementioned U.S. Pat. No. 4,837,210, the contents of which are incorporated by reference.

The compound 3-dibutylamino-6-methyl-7-anilinofluoran has the following chemical structure:

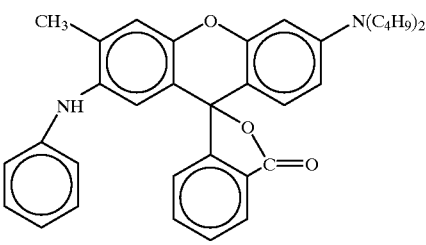

This compound is available from ESCO Company under the designation ODB-2 and can also be prepared in accordance with the process described in aforementioned U.S. Pat. No. 4,837,210.

The color former composition can be prepared by mixing 3-diethylamino-6-methyl-7-(2',4'-dimethylanilino)fluoran (hereafter referred to as CF 1) and 3-dibutylamino-6-methyl-7-anilinofluoran (hereafter referred to as CF 2) in appropriate amounts. In general, the composition comprises from about 65 to about 90% by weight of CF 1 and from about 10 to about 35% by weight of CF 2, said percentages being based on the total weight of CF 1 and CF 2. Preferably, the composition comprises from about 70 to about 90% by weight of CF 1 and from about 10 to about 30% by weight of CF 2, based on the total weight of CF 1 and CF 2. Most preferably, the composition comprises from about 70 to about 80% by weight of CF 1 and from about 20 to about 30% by weight of CF 2 based on the total weight of CF 1 and CF 2.

The mixture of color formers is preferably in a condition suitable for rapid dissolution into an appropriate organic solvent. This may be a mixture of the color formers in powdered form having a particle size typically ranging from about 0.1 to about 1,000 microns. The organic solvent is an aromatic solvent, an aliphatic solvent or a mixture of aromatic and aliphatic solvents. Typical aromatic solvents include alkylated naphthalenes, polyphenyl alkanes, substituted biphenyls, substituted terphenyls, phthalic acid esters and mixtures thereof. Typical aliphatic solvents include vegetable oils (e.g., canola oil, rapeseed oil, coconut oil or palm oil), mineral oil, kerosene, other aliphatic hydrocarbons and mixtures thereof.

From the chemical structures of 3-diethylamino-6-methyl-7-(2',4'-dimethylanilino)fluoran and 3dibutylamino-6-methyl-7-anilinofluoran, it can be anticipated that aromatic solvents are more suitable for dissolving the compounds. If one can attain a higher concentration of a color former in an organic solvent, a darker image can be obtained and less solvent is required. Due to health and environmental concerns, as well as cost, it would be preferable if aliphatic solvents could be used in whole or in large part. By using the mixture of color formers of the present invention, a higher concentration of the mixture in an organic solvent solution can be attained compared to the concentrations of either of the individual color formers. Furthermore, where a mixture of aromatic and aliphatic solvents are used, the present invention can enable a higher percentage of aliphatic solvent to be used while maintaining a high concentration of the mixture of color formers. A typical mixture of organic solvents can comprise from about 5 to about 95% by weight of an aromatic solvent and from about 5 to about 95% by weight of an aliphatic solvent based on the total weight of the organic solvent. A preferred mixture can comprise from about 10 to about 90% by weight of an aromatic solvent and from about 10 to about 90% by weight of an aliphatic solvent based on the total weight of the organic solvent.

As a still further advantage, the mixture of color formers can be dissolved into an aromatic solvent and then diluted with an inexpensive aliphatic solvent, such as kerosene, without causing color former to deposit from the solution. The addition of kerosene to the composition can substantially reduce the viscosity thereof and thereby facilitate preparation and/or performance of the microcapsules.

The composition comprised of the mixture of color formers and the organic solvent can be formed by combining a powdered mixture of the color formers with the organic solvent at an elevated temperature in the range of from about 30° to about 140° C., preferably from about 80° to about 135° C. under agitation and permitting the solution to cool to about room temperature. Alternatively, the individual color formers can be sequentially mixed into the organic solvent at the elevated temperature or separate solutions of each color former can be added together at an elevated temperature and the combined solution permitted to cool.

It has been found that the presence of an additional color former, namely 3-diethylamino-6-methyl-7-anilinofluoran (hereafter referred to as CF 3) or 3-diethylamino6-methyl-7-(3'-methylanilino)fluoran (hereafter CF 4) can further improve the solubility of the mixture of CF 1 and CF 2 in certain solvent systems and conditions. CF 3 and CF 4 have the following formulas and are also commercially available from ESCO Company and Yamamoto Chemicals, Inc. under the designations N-102 and ODB-7, respectively:

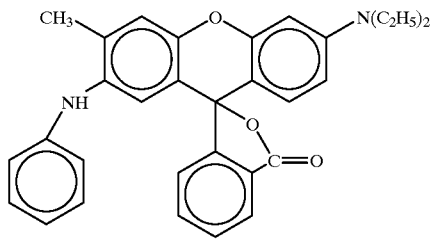

-continued

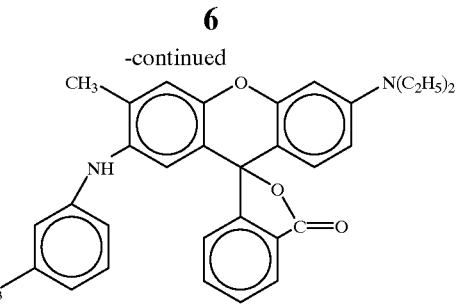

A composition containing CF 1, CF 2 and CF 3 typically comprises from about 10 to about 90% by weight of CF 1, from about 5 to about 70% by weight of CF 2, and from about 5 to about 70% by weight of CF 3, said percentages being based on the total weight of CF 1, CF 2 and CF 3. Preferably, the composition comprises from about 40 to about 90% by weight of CF 1, from about 5 to about 50% by weight of CF 2, and from about 5 to about 50% by weight of CF 3, based on the total weight of CF 1, CF 2 and CF 3. Most preferably, the composition comprises from about 40 to about 80% by weight of CF 1, from about 10 to about 50% by weight of CF 2, and from about 10 to about 30% by weight of CF 3, based on the total weight of CF 1, CF 2 and CF 3.

The composition comprised of CF 1, CF 2, and CF 3 is particularly useful in aromatic solvents, such as SAS-310 (which is a mixture primarily composed of sec-butyl-diphenylmethane, sec-butyl-1,1-diphenylethane and sec-butyl-1,2-diphenylethane that is commercially available from Nisseki Chemical Texas Inc.). This mixture of color formers can provide a higher concentration compared to CF 1 and CF 2 when dissolved at moderate temperatures, but still provides acceptable results when dissolved at higher temperatures up to about 140° C., preferably from about 50 to about 100° C.

A composition containing CF 1, CF 2 and CF 4 typically comprises from about 5 to about 90% by weight of CF 1, from about 5 to about 90% by weight of CF 2, and from about 5 to about 90% by weight of CF 4, said percentages being based on the total weight of CF 1, CF 2 and CF 4. Preferably, the composition comprises from about 20 to about 50% by weight of CF 1, from about 20 to about 50% by weight of CF 2, and from about 10 to about 60% by weight of CF 4, based on the total weight of CF 1, CF 2 and CF 4. Most preferably, the composition comprises from about 25 to about 50% by weight of CF 1, from about 25 to about 50% by weight of CF 2, and from about 20 to about 40% by weight of CF 4, based on the total weight of CF 1, CF 2and CF 4.

The composition comprised of CF 1, CF 2, and CF 4 is particularly useful when dissolved in aliphatic solvents, such as canola oil, at higher temperatures of from about 30 to about 140° C., preferably from about 50 to about 135° C. In this respect, it has been found that a mixture of CF 2 and CF 4 also provides advantageous results and constitutes a further aspect of the present invention. Such a composition generally comprises from about 5 to about 95% by weight of CF 2 and from about 5 to about 95% by weight of CF 4, said percentages being based on the total weight of CF 2 and CF 4. Preferably, the composition comprises from about 20 to about 80% by weight of CF 2 and from about 20 to about 80% by weight of CF 4, based on the total weight of CF 2 and CF 4. Most preferably, the composition comprises from about 40 to about 60% by weight of CF 2 and from about 40 to about 60% by weight of CF 4 based on the total weight of CF 2 and CF 4.

A further mixture of color formers that has been found to be especially effective in certain solvent systems is a mixture of CF 1 and CF 4. While the mixture has relatively limited solubility in canola oil, it has been found to be particularly effective in a solvent system such as a mixture of an aromatic solvent (e.g., SAS-310) and kerosene (e.g., odorless kerosene commercially available under the designation Exxon D-110). The most effective amounts of each of these solvents in the mixture, like other mixtures of solvents, can readily be determined for a particular mixture of color formers. However, one effective mixture of SAS-310 and kerosene for a mixture of CF 1 and CF 4 is from about 60 to about 80% by volume of SAS-310 and from about 20 to about 40% by volume of kerosene based on the total volume of the mixture with a particularly good mixture being about 70% by volume of SAS-310 and about 30% by volume of kerosene.

A composition containing CF 1 and CF 4 typically comprises from about 5 to about 95% by weight of CF 1 and from about 5 to about 95% by weight of CF 4, said percentages being based on the total weight of CF 1 and CF 4. Preferably, the composition comprises from about 20 to about 80% by weight of CF 1 and from about 20 to about 80% by weight of CF 4, based on the total weight of CF 1 and CF 4. Most preferably, the composition comprises from about 40 to about 60% by weight of CF 1 and from about 40 to about 60% by weight of CF 4 based on the total weight of CF 1 and CF 4.

The composition comprising the mixture of color formers and the selected organic solvent forms a colorless solution that can react with an appropriate developer to form a dark mark. As noted above, a substantial advantage which can be attained in accordance with the various aspects of the present invention is that the defined mixtures of color formers can provide a high concentration in an organic solvent and that such concentration is greater than any of the individual color formers under the same conditions. In general, the color former composition comprises from about 50 to about 99% by weight of the organic solvent and from about 1 to about 50% by weight of the mixture of color formers based on the total weight of the composition. Preferably, the composition comprises from about 70 to about 97% by weight of the organic solvent and from about 3 to about 30% by weight of the mixture of color formers based on the total weight of the composition. Most preferably, the composition comprises from about 75 to about 94% by weight of the organic solvent and from about 6 to about 25% by weight of the mixture of color formers based on the total weight of the composition. Depending on the organic solvent used, the mixture of color formers can advantageously be present in a concentration greater than about 6%, preferably greater than about 10%, most preferably greater than about 12% by weight of the composition. The presence of certain other color formers can decrease the solubility of the defined mixtures in certain solvents and such presence is preferably avoided to the extent that the advantages of the present invention are substantially adversely affected.

The solution of color formers and organic solvent can be formulated into microcapsules according to any process known in the art including coacervation and in situ polymerization. Illustrative techniques for forming microcapsules are described in U.S. Pat. Nos. 2,800,457, 3,533,958, 3,755,190, 4,001,140 and 4,100,103, the contents of which are incorporated by reference.

Known developers can be used with the microcapsules of the present invention in order to provide pressure sensitive or heat sensitive recording materials. For instance, the developers can be a variety of organic or inorganic materials, such as those disclosed in aforementioned U.S. Pat. Nos. 4,226,912 and 4,837,210, the contents of which are incorporated by reference. As an illustration, particularly useful developer materials for the compositions of the present invention include phenolic resins and activated clay. These U.S. patents and other patent documents further describe the well known techniques of preparing recording materials utilizing CF, CB and CFB sheets.

The following Examples illustrate the improved solubility that can be obtained in accordance with various aspects of the present invention, particularly in relation to certain Comparative Examples. It is to be understood that the present invention is defined by the appended claims and not the specific details of the Examples.

To determine the solubility of color formers in various solvent systems and at various temperatures, a series of experiments were conducted. All tests were performed by HPLC against external standards. In particular, approximately 0.2 to 0.4 gram of the color former solution is introduced by pipette into a 50 ml volumetric flask containing about 0.01 gram of anthracene. The exact weights of the sample and the anthracene in the flask are recorded. After dilution to the mark with a 1:1 (v/v) mixture of tetrahydrofuran and acetonitrile and mixing, a portion of the solution is filtered into a HPLC sample vial. Ten microliters of the sample are injected onto a HPLC system using a gradient solvent system and a UV detector set at 325 nm. The column (purchased from Micra Scientific) is 33 mm by 4.6 mm in size and contains 1.5 micron non-porous silica ODS II. The sample is eluted at a flow rate of 0.9 ml/min with solvent comprised of acetonitrile (solvent A), tetrahydrofuran (solvent B) and a 5 mM tetrabutyl-ammonium dihydrogen phosphate buffer containing 25% by volume acrylonitrile (solvent C). The gradient program is begun at a composition of 16:5:79 (A:B:C) for 1 minute, increased to 60:5:35 (A:B:C) over 7 minutes, and held at that composition for 4 minutes. The amount of each color former in the sample was determined using anthracene as an internal standard. Results are in % by weight.

Isothermal tests were conducted by stirring an excess of the color former in the solvent for about 24 hours at a constant temperature. After allowing undissolved material to settle, a small sample of the supernatant liquid was withdrawn, weighed, and analyzed by HPLC to determine the solubility of the color former. In those instances where the color former does not completely dissolve at the desired temperature, it is necessary to immerse the sample in a hot oil bath at the desired temperature and allow it to sit for at least 24 hours more, but without stirring. This procedure will allow any undissolved material to settle out thereby allowing for a clean (i.e., no undissolved material) sample to be taken.

High temperature dissolution tests were conducted by dissolving a quantity of the color former by heating together with the solvent under stirring. Afterwards, the mixture was allowed to cool to room temperature and let stand for about 24 hours. The color former remaining in solution was measured by HPLC to determine the solubility of the color former.

To determine the solubility of a mixture of color formers, equal weights of the color formers were initially charged to the solvent. HPLC analysis determined the ratio of color former in solution at the end of the test.

Table 1 sets forth the results of a series of isothermal experiments using SAS-310 as the organic solvent. In the Table, the percentages are percent by weight of the solution and the values in parentheses are the weight percentages of each color former in solution.

TABLE 1

| Color Former(s) | 25° C. | 50° C. | 80° C. |
|---|---|---|---|
| CF 1 | 1.8% | 3.8% | 8.7% |
| CF 2 | 0.3% | 0.9% | 3.1% |
| CF 3 | 0.6% | 1.2% | 3.1% |
| CF 1/CF 3 | 1.1% (0.8/0.3) | 1.4% (0.6/0.8) | 3.6% (2.4/1.2) |
| CF 1/CF 2 | 2.4% (1.9/0.5) | 5.5% (4.2/1.3) | 12.9% (8.4/4.5) |
| CF 2/CF 3 | 1.1% (0.7/0.4) | 2.4% (1.3/1.1) | 6.4% (3.1/3.3) |
| CF 1/CF 3/CF 2 | 3.0% (2.0/0.5/0.5) | 5.9% (3.9/0.8/1.2) | 9.3% (3.8/2.0/3.5) |

From the results in Table 1, it can be understood that the mixture of CF 1 and CF 2 provides a higher concentration in the solution than either of the individual color formers at each of the isothermal test temperatures. This result was not obtained with the mixture of CF 1 and CF 3 and was substantially superior to the mixture of CF 2 and CF 3. However, the addition of CF 3 to the mixture of CF 1 and CF 2 provided improved solubility at 25° C. and 50° C., but not at 80° C.

High Temperature Reference Test

In a high temperature dissolution test, 12% by weight of CF 1 was dissolved at 100° C. and allowed to cool to 25° C. After crystallization, a solution of 6.0–6.8% of CF 1 remained.

High Temperature Dilution Test

The effect of kerosene as a diluent was tested by forming hot CF 1/CF 2/SAS-310 solutions in a proportion similar to the 12.9% mixture (80° C.) in the above isothermal study. On dilution with 27% kerosene (by wt.) and cooling to 25° C., the color formers remained in solution. That is, the reduction in % dissolved color former came solely from the dilution factor.

High Temperature Tests Using CF 4 and Canola Oil

Saturated solutions of CF 4 (by itself and in mixtures with other color formers) in canola oil were prepared at an elevated temperature of about 135° C. and cooled to 25° C. to give the results in Table 2.

TABLE 2

| Color Former Mixture | Solubility |
|---|---|
| CF 4 | 3.4% |
| CF 4/CF 1 | 2.1% (0.7/1.4) |
| CF 4/CF 2 | 12.0% (6.0/6.0) |
| CF 4/CF 1/CF 2 | 16.0% (4.7/5.6/5.7) |

Additional Tests Using Canola Oil

In isothermal studies single color formers had relatively low solubilities. At 25° C., CF 1 had the highest solubility at only 0.3%. At 80° C., CF 1 was soluble to 0.8–0.9%.

When individual color formers were heated to 100° C. using the high temperature method, the final solutions after cooling were as follows: CF 3=1.3%; CF 1=1.4%; CF 2=1.9%.

When mixtures of the color formers were heated to 135° C. to dissolve, enhanced solubility was observed with particularly high solubility being obtained with a mixture of CF 1 and CF 2.

TABLE 3

| Color Former Mixture | Solubility |
|---|---|
| CF 1/CF 2 | >13% |
| CF 2/CF 3 | 4.6% (2.4/2.2) |
| CF 1/CF 3/CF 2 | 5.0% (1.8/1.5/1.7) |

Additional Tests Using Kerosene Mixtures

A quantity of the color former in an initial 1:1 ratio was dissolved by heating to about 135° C. together with the solvent (canola oil or SAS-310) under stirring. Odorless room temperature kerosene (Exxon D-110) was then added to dilute the mixture. The mixture was allowed to cool to room temperature and permitted to stand for about 24 hrs to allow crystallization. The color former content of the remaining solution was measured by HPLC and the wt % of each color former calculated. The results are shown in the following Tables 4 and 5 wherein the total color former solubility is shown, followed by the percentage of each color former in parentheses.

TABLE 4

Color Former Solubility in Canola Oil: Kerosene (70:30)

| Color Former Mixture | Solubility (Ratio) |
|---|---|
| CF4/CF2 | 8.1% (4.5/3.6) |
| CF1/CF2 | 11.8% (5.8/6.0) |
| CF4/CF1/CF2 | 6.9% (2.0/2.5/2.4)* |

*not duplicated

TABLE 5

Color Former Solubility in SAS-310: Kerosene (70:30)

| Color Former Mixture | Solubility (Ratio) |
|---|---|
| CF1/CF2 | 10.0% (6.8/3.2) |
| CF1/CF4 | 13.8% (6.9/6.9) |
| CF4/CF2 | 17.6% (9.1/8.5) |
| CF4/CF1/CF2 | 16.8% (5.6/5.7/5.5) |

While certain preferred embodiments of the invention have been shown by way of illustration and discussion, many modifications will occur to those of ordinary skill in the art. It is to be understood that the following claims are intended to encompass all such modifications and changes as fall within the spirit and scope of the invention.

We claim:

1. A color former composition comprising a mixture of from about 65 to about 90% by weight of 3-diethylamino-6-methyl-7-(2',4'-dimethylanilino)fluoran and from about 10 to about 35% by weight of 3-dibutylamino-6-methyl-7-anilinofluoran based on the total weight of 3-diethylamino-6-methyl-7-(2',4'-dimethylanilino)fluoran and 3-dibutylamino-6 -methyl-7-anilinofluoran.

2. The color former composition of claim 1 wherein the mixture is comprised of from about 70 to about 90% by weight of 3-diethylamino-6-methyl-7-(2',4'-dimethylanilino)fluoran and from about 10 to about 30% by weight of 3-dibutylamino-6-methyl-7-anilinofluoran, said percentages being based on the total weight of 3-diethylamino-6-methyl-7-(2',4'-dimethylanilino)fluoran and 3-dibutylamino-6-methyl-7-anilinofluoran.

3. The color former composition of claim 1 wherein the mixture is comprised of from about 70 to about 80% by weight of 3-diethylamino-6-methyl-7-(2',4'- dimethylanilino)fluoran and from about 20 to about 30% by weight of 3-dibutylamino-6-methyl-7-anilinofluoran, said percentages being based on the total weight of 3-diethylamino-6-methyl-7-(2',4'-dimethylanilino)fluoran and 3-dibutylamino-6-methyl-7-anilinofluoran.

4. The color former composition of claim 1 wherein the composition further comprises from about 50 to about 99% by weight of an organic solvent and wherein the mixture of color formers is present in an amount of from about 1 to about 50% by weight, said percentages being based on the total weight of the composition.

5. The color former composition of claim 4 wherein the composition comprises from about 70 to about 97% by weight of an organic solvent and from about 3 to about 30% by weight of the mixture of color formers, said percentages being based on the total weight of the composition.

6. The color former composition of claim 4 wherein the composition comprises from about 75 to about 94% by weight of an organic solvent and from about 6 to about 25% by weight of the mixture of color formers, said percentages being based on the total weight of the composition.

7. The color former composition of claim 4 wherein the organic solvent is selected from the group consisting of an aromatic solvent, an aliphatic solvent and mixtures thereof.

8. The color former composition of claim 7 wherein the organic solvent is a mixture of an aromatic solvent and an aliphatic solvent.

9. The color former composition of claim 8 wherein the organic solvent is comprised of a mixture of from about 5 to about 95% by weight of the aromatic solvent and from about 5 to about 95% by weight of the aliphatic solvent, said percentages being based on the total weight of the organic solvent.

10. The color former composition of claim 8 wherein the organic solvent is comprised of a mixture of from about 10 to about 90% by weight of the aromatic solvent and from about 10 to about 90% by weight of the aliphatic solvent, said percentages being based on the total weight of the organic solvent.

11. The color former composition of claim 8 wherein the aliphatic solvent is kerosene.

12. The color former composition of claim 4 wherein the organic solvent is an aliphatic solvent.

13. The color former composition of claim 12 wherein the organic solvent is a vegetable oil.

14. The color former composition of claim 13 wherein the organic solvent is canola oil.

15. A color former composition comprising a mixture of 3-diethylamino-6-methyl-7-(2',4'-dimethylanilino)fluoran, 3-dibutylamino-6-methyl-7-anilinofluoran and 3-diethylamino-6-methyl-7-anilinofluoran.

16. The color former composition of claim 15 wherein the composition comprises from about 10 to about 90% by weight of 3-diethylamino-6-methyl-7-(2',4'-dimethylanilino)fluoran, from about 5 to about 70% by weight of 3-dibutylamino-6-methyl-7-anilinofluoran, and from about 5 to about 70% by weight of 3-diethylamino-6-methyl-7-anilinofluoran, said percentages being based on the total weight of 3-diethylamino-6-methyl-7-(2',4'-dimethylanilino)fluoran, 3-dibutylamino-6-methyl-7-anilinofluoran and 3-diethylamino-6-methyl-7-anilinofluoran.

17. The color former composition of claim 15 wherein the composition comprises from about 40 to about 90% by weight of 3-diethylamino-6-methyl-7-(2',4'-dimethylanilino)fluoran, from about 5 to about 50% by weight of 3-dibutylamino-6-methyl-7-anilinofluoran, and from about 5 to about 50% by weight of 3-diethylamino-6-methyl-7-anilinofluoran, said percentages being based on the total weight of 3-diethylamino-6-methyl-7-(2',4'-dimethylanilino)fluoran, 3dibutylamino-6-methyl-7-anilinofluoran and 3-diethylamino-6-methyl-7-anilinofluoran.

18. The color former composition of claim 15 wherein the composition comprises from about 40 to about 80% by weight of 3-diethylamino-6-methyl-7-(2',4'-dimethylanilino)fluoran, from about 10 to about 50% by weight of 3-dibutylamino-6-methyl-7-anilinofluoran, and from about 10 to about 50% by weight of 3-diethylamino-6-methyl-7-anilinofluoran, said percentages being based on the total weight of 3-diethylamino-6-methyl-7-(2',4'-dimethylanilino)fluoran, 3-dibutylamino-6-methyl-7-anilinofluoran and 3-diethylamino-6-methyl-7-anilinofluoran.

19. A color former composition comprising a mixture of 3-diethylamino-6-methyl-7-(2',4'-dimethylanilino)fluoran, 3-dibutylamino-6-methyl-7-anilinofluoran and 3-diethylamino-6-methyl-7-(3'-methylanilino)fluoran.

20. The color former composition of claim 19 wherein the composition comprises from about 5 to about 90% by weight of 3-diethylamino-6-methyl-7-(2',4'-dimethylanilino)fluoran, from about 5 to about 90% by weight of 3-dibutylamino-6-methyl-7-anilinofluoran, and from about 5 to about 90% by weight of 3-diethylamino-6-methyl-7-(3'-methylanilino)fluoran, said percentages being based on the total weight of 3-diethylamino-6-methyl-7-(2',4'-dimethylanilino)fluoran, 3-dibutylamino-6-methyl-7-anilinofluoran and 3-diethylamino-6-methyl-7-(3'-methylanilino)fluoran.

21. The color former composition of claim 19 wherein the composition comprises from about 20 to about 50% by weight of 3-diethylamino-6-methyl-7-(2',4'-dimethylanilino)fluoran, from about 20 to about 50% by weight of 3-dibutylamino-6-methyl-7-(3'-methylanilino)fluoran, and from about 10 to about 60% by weight of 3-diethylamino-6-methyl-7-(3'-methylanilino)fluoran, said percentages being based on the total weight of 3-diethylamino-6-methyl-7-(2',4'-dimethylanilino)fluoran, 3-dibutylamino-6-methyl-7-anilinofluoran and 3-diethylamino-6-methyl-7-(3'-methylanilino)fluoran.

22. The color former composition of claim 19 wherein the composition comprises from about 25 to about 50% by weight of 3-diethylamino-6-methyl-7-(2',4'-dimethylanilino)fluoran, from about 25 to about 50% by weight of 3-dibutylamino-6-methyl-7-anilinofluoran, and from about 20 to about 40% by weight of 3-diethylamino-6-methyl-7-(3'-methylanilino)fluoran, said percentages being based on the total weight of 3-diethylamino-6-methyl-7-(2',4'-dimethylanilino)fluoran, 3dibutylamino-6-methyl-7-anilinofluoran and 3diethylamino-6-methyl-7-(3'-methylanilino)fluoran.

23. A color former composition comprising a mixture of 3-diethylamino-6-methyl-7-(2',4'-dimethylanilino)fluoran and 3-diethylamino-6-methyl-7-(3'-methylanilino)fluoran.

24. The color former composition of claim 23 wherein the mixture comprises from about 5 to about 95% by weight of 3-diethylamino-6-methyl-7-(2',4'-dimethylanilino)fluoran and from about 5 to about 95% by weight of 3-diethylamino-6-methyl-7-(3'-methylanilino)fluoran based on the total weight of 3-diethylamino-6-methyl-7-(2',4'-dimethylanilino)fluoran and 3-diethylamino-6-methyl-7-(3'-methylanilino)fluoran.

25. The color former composition of claim 23 wherein the mixture comprises from about 20 to about 80% by weight of 3-diethylamino-6-methyl-7-(2',4'-dimethylanilino)fluoran and from about 20 to about 80% by weight of 3-diethylamino-6-methyl-7-(3'-methylanilino)fluoran based on the total weight of 3-diethylamino-6-methyl-7-(2',4'-dimethylanilino)fluoran and 3-diethylamino-6-methyl-7-(3'-methylanilino)fluoran.

26. The color former composition of claim 23 wherein the mixture comprises from about 40 to about 60% by weight of 3-diethylamino-6-methyl-7-(2',4'-dimethylanilino)fluoran and from about 40 to about 60% by weight of 3-diethylamino-6-methyl-7-(3'-methylanilino)fluoran based on the total weight of 3-diethylamino-6-methyl-7-(2',4'-dimethylanilino)fluoran and 3diethylamino-6-methyl-7-(3'-methylanilino)fluoran.

27. A color former composition comprising a mixture of 3-dibutylamino-6-methyl-7-anilinofluoran and 3diethylamino-6-methyl-7-(3'-methylanilino)fluoran.

28. The color former composition of claim 27 wherein the mixture is comprised of from about 5 to about 95% by weight of 3-dibutylamino-6-methyl-7-anilinofluoran and from about 5 to about 95% by weight of 3-diethylamino-6-methyl-7-(3'-methylanilino)fluoran, said percentages being based on the total weight of 3-dibutylamino-6-methyl-7-anilinofluoran and 3-diethylamino-6-methyl-7-(3'-methylanilino)fluoran.

29. The color former composition of claim 27 wherein the mixture is comprised of from about 20 to about 80% by weight of 3-dibutylamino-6-methyl-7-anilinofluoran and from about 20 to about 80% by weight of 3-diethylamino-6-methyl-7-(3'-methylanilino)fluoran, said percentages being based on the total weight of 3-dibutylamino-6-methyl-7-anilinofluoran and 3-diethylamino-6-methyl-7-(3'-methylanilino)fluoran.

30. The color former composition of claim 27 wherein the mixture is comprised of from about 40 to about 60% by weight of 3-dibutylamino-6-methyl-7-anilinofluoran and from about 40 to about 60% by weight of 3-diethylamino-6-methyl-7-(3'-methylanilino)fluoran, said percentages being based on the total weight of 3-dibutylamino-6-methyl-7-anilinofluoran and 3-diethylamino-6-methyl-7-(3'-methylanilino)fluoran.

31. Microcapsules containing a color former composition and being capable of forming a recording material wherein the color former composition comprises an organic solvent and a mixture of from about 65 to about 90% by weight of 3-diethylamino-6-methyl-7-(2',4'-dimethylanilino)fluoran and from about 10 to about 35% by weight of 3-dibutylamino-6-methyl-7-anilinofluoran based on the total weight of 3-diethylamino-6-methyl-7-(2',4'-dimethylanilino)fluoran and 3-dibutylamino-6-methyl-7-anilinofluoran.

32. The microcapsules of claim 31 wherein the mixture is comprised of from about 70 to about 90% by weight of 3diethylamino-6-methyl-7-(2',4'-dimethylanilino)fluoran and from about 10 to about 30% by weight of 3-dibutylamino-6-methyl-7-anilinofluoran, said percentages being based on the total weight of 3-diethylamino-6-methyl-7-(2',4'-dimethylanilino)fluoran and 3-dibutylamino-6-methyl-7-anilinofluoran.

33. The microcapsules of claim 31 wherein the mixture is comprised of from about 70 to about 80% by weight of 3-diethylamino-6-methyl-7-(2',4'-dimethylanilino)fluoran and from about 20 to about 30% by weight of 3-dibutylamino-6-methyl-7-anilinofluoran, said percentages being based on the total weight of 3-diethylamino-6-methyl-7-(2',4'-dimethylanilino)fluoran and 3dibutylamino-6-methyl-7-anilinofluoran.

34. The microcapsules of claim 31 wherein the composition comprises from about 50 to about 99% by weight of an organic solvent and from about 1 to about 50% by weight of the mixture of color formers based on the total weight of the composition.

35. The microcapsules of claim 34 wherein the organic solvent is a mixture of an aromatic solvent and an aliphatic solvent.

36. The microcapsules of claim 35 wherein the organic solvent is comprised of a mixture of from about 5 to about 95% by weight of the aromatic solvent and from about 5 to about 95% by weight of the aliphatic solvent, said percentages being based on the total weight of the organic solvent.

37. The microcapsules of claim 36 wherein the aliphatic solvent is kerosene.

38. Microcapsules containing a color former composition and being capable of forming a recording material wherein the color former composition comprises from about 10 to about 90% by weight of 3-diethylamino-6-methyl-7-(2',4'-dimethylanilino)fluoran, from about 5 to about 70% by weight of 3-dibutylamino-6-methyl-7-anilinofluoran, and from about 5 to about 70% by weight of 3-diethylamino-6-methyl-7-anilinofluoran, said percentages being based on the total weight of 3-diethylamino-6-methyl-7-(2',4'-dimethylanilino)fluoran, 3-dibutylamino-6-methyl-7-anilinofluoran and 3-diethylamino-6-methyl-7-anilinofluoran.

39. The microcapsules of claim 38 wherein the composition comprises from about 40 to about 90% by weight of 3-diethylamino-6-methyl-7-(2',4'-dimethylanilino)fluoran, from about 5 to about 50% by weight of 3-dibutylamino-6-methyl-7-anilinofluoran, and from about 5 to about 50% by weight of 3-diethylamino-6-methyl-7-anilinofluoran, said percentages being based on the total weight of 3-diethylamino-6-methyl-7-(2',4'-dimethylanilino)fluoran, 3-dibutylamino-6-methyl-7-anilinofluoran and 3-diethylamino-6methyl-7-anilinofluoran.

40. Microcapsules containing a color former composition and being capable of forming a recording material wherein the color former composition comprises from about 5 to about 90% by weight of 3-diethylamino-6-methyl-7-(2',4'-dimethylanilino)fluoran, from about 5 to about 90% by weight of 3-dibutylamino-6-methyl-7-anilinofluoran, and from about 5 to about 90% by weight of 3-diethylamino-6-methyl-7-(3'-methylanilino)fluoran, said percentages being based on the total weight of 3-diethylamino-6-methyl-7-(2', 4'-dimethylanilino)fluoran, 3-dibutylamino-6-methyl-7-anilinofluoran and 3-diethylamino-6-methyl-7-(3'-methylanilino)fluoran.

41. The microcapsules of claim 40 wherein the composition comprises from about 20 to about 50% by weight of 3-diethylamino-6-methyl-7-(2',4'-dimethylanilino)fluoran, from about 20 to about 50% by weight of 3-dibutylamino-6-methyl-7-anilinofluoran, and from about 10 to about 60% by weight of 3-diethylamino-6-methyl-7-(3'-methylanilino) fluoran, said percentages being based on the total weight of 3-diethylamino-6-methyl-7-(2',4'-dimethylanilino)fluoran, 3-dibutylamino-6-methyl-7-anilinofluoran and 3-diethylamino-6-methyl-7-(3'-methylanilino)fluoran.

42. Microcapsules containing a color former composition and being capable of forming a recording material wherein the color former composition comprises an organic solvent and a mixture of 3-dibutylamino-6-methyl-7-anilinofluoran and 3-diethylamino-6-methyl-7-(3'-methylanilino)fluoran.

43. The microcapsules of claim 42 wherein the mixture is comprised of from about 5 to about 95% by weight of 3-dibutylamino-6-methyl-7-anilinofluoran and from about 5 to about 95% by weight of 3-dibutylamino-methyl-7-(3'-methylanilino)fluoran, said percentages being based on the total weight of 3-dibutylamino-6methyl-7-anilinofluoran and 3-diethylamino-6-methyl-7-(3'-methylanilino)fluoran.

44. The microcapsules of claim 42 wherein the mixture is comprised of from about 20 to about 80% by weight of 3-dibutylamino-6-methyl-7-anilinofluoran and from about 20 to about 80% by weight of 3-diethylamino-6-methyl-7-(3'-methylanilino)fluoran, said percentages being based on the total weight of 3-dibutylamino-6-methyl-7-anilinofluoran and 3-diethylamino-6-methyl-7-(3'-methylanilino)fluoran.

45. Microcapsules containing a color former composition and being capable of forming a recording material wherein the color former composition comprises a mixture of 3-diethylamino-6-methyl-7-(2',4'-dimethylanilino)fluoran and 3-diethylamino-6-methyl-7-(3'-methylanilino)fluoran.

46. The microcapsules of claim 45 wherein the mixture comprises from about 5 to about 95% by weight of 3-diethylanilino-6-methyl-7-(2',4'-dimethylanilino)fluoran and from about 5 to about 95% by weight of 3-diethylamino-6-methyl-7-(3'-methylanilino)fluoran based on the total weight of 3-diethylamino-6-methyl-7-(2',4'-dimethylanilino)fluoran and 3-diethylamino-6-methyl-7-(3'-methylanilino)fluoran.

47. The microcapsules of claim 45 wherein the mixture comprises from about 20 to about 80% by weight of 3-diethylamino-6methyl-7-(2',4'-dimethylanilino)fluoran and from about 20 to about 80% by weight of 3-diethylamino-6-methyl-7-(3'-methylanilino)fluoran based on the total weight of 3-diethylamino-6-methyl-7-(2',4'-dimethylanilino)fluoran and 3-diethylamino-6-methyl-7-(3'-methylanilino)fluoran.

48. The microcapsules of claim 45 wherein the mixture comprises from about 40 to about 60% by weight of 3-diethylamino-6-methyl-7-(2',4'-dimethylanilino)fluoran and from about 40 to about 60% by weight of 3-diethylamino-6-methyl-7-(3'-methylanilino)fluoran based on the total weight of 3-diethylamino-6-methyl-7-(2',4'-dimethylanilino)fluoran and 3-diethylamino-6-methyl-7-(3'-methylanilino)fluoran.

49. The microcapsules of claim 45 wherein the composition comprises from about 50 to about 99% by weight of an organic solvent and from about 1 to about 50% by weight of the mixture of color formers based on the total weight of the composition wherein the organic solvent is a mixture of an aromatic solvent and kerosene.

* * * * *

UNITED STATES PATENT AND TRADEMARK OFFICE
CERTIFICATE OF CORRECTION

PATENT NO.   : 6,217,643 B1
DATED        : April 17, 2001
INVENTOR(S)  : Francis R. Kearney et al.

It is certified that error appears in the above-identified patent and that said Letters Patent is hereby corrected as shown below:

Column 4,
Line 1, change "3dibutylamino" to -- 3-dibutylamino --.
Line 1, change "3dibutylamino" to -- 3-dibutylamino --.
Line 1, change "3diethylamino6-methyl" to -- 3-diethylamino-6-methyl --.

Column 12,
Lines 4 and 52, change "3dibutylamino" to -- 3-dibutylamino --.
Lines 37-38, change "3-dibutylamino-6-methyl-7-(3'-methylanilino)fluoran" to -- 3-dibutylamino-6-methyl-7-anilinofluoran --
Line 53, change "3diethylamino" to -- 3-diethylamino --.

Column 13,
Lines 13, 17 and 54, change "3diethylamino" to -- 3-diethylamino --.
Line 66, change "3dibutylamino" to -- 3-dibutylamino --.

Column 14,
Line 37, change "6methyl" to -- 6-methyl --.

Column 15,
Lines 1-2, change "3-dibutylamino-methyl-7-(3'-methylanilino)fluoran" to -- 3-diethylamino-6-methyl-7-(3'methylanilino)fluoran --.

Column 16,
Line 3, change "6methyl" to -- 6-methyl --.

Signed and Sealed this

Second Day of July, 2002

*Attest:*

JAMES E. ROGAN
*Attesting Officer*    *Director of the United States Patent and Trademark Office*